United States Patent [19]

Haruvy et al.

[11] Patent Number: 5,272,240
[45] Date of Patent: Dec. 21, 1993

[54] FAST SOL-GEL PREPARATION OF GLASSES

[75] Inventors: Yair Haruvy; Stephen E. Webber, both of Austin, Tex.

[73] Assignee: Board of Regents, The University of Texas System, Austin, Tex.

[21] Appl. No.: 707,140

[22] Filed: May 29, 1991

[51] Int. Cl.$^5$ ............................................. C08G 77/06
[52] U.S. Cl. ......................................... 528/10; 528/12
[58] Field of Search ................................... 528/10, 12

[56] References Cited

U.S. PATENT DOCUMENTS

| | | | |
|---|---|---|---|
| 3,623,903 | 11/1971 | Dislich et al. | 117/124 E |
| 4,238,590 | 12/1980 | Scholze et al. | 528/5 |
| 4,539,232 | 9/1985 | Burzynski et al. | 427/387 |
| 4,604,443 | 8/1986 | Chang et al. | 528/28 |
| 4,754,012 | 6/1988 | Yoldas et al. | 528/10 |
| 5,008,219 | 4/1991 | Hara | 501/12 |
| 5,045,592 | 9/1991 | Weiss et al. | 524/755 |

FOREIGN PATENT DOCUMENTS

0310308A2 9/1988 European Pat. Off. .

OTHER PUBLICATIONS

Kobayashi et al., "A Transparent Alumina Film Doped with Laser Dye and its Emission Properties," J. of Non-Crys. Solids 105 (1988) 198-200.
Yoldas, "Preparation of Glasses and Ceramics From Metal-Organic Compounds," J. of Mat. Sci. 12 (1977) 1203-1208.
Reisfield, "Criteria and Prospects of New Lasers Based on Fluorescent Dyes in Glasses," J. De Physique (1987) C7-423-C7-426.
Reisfeld et al., "A new Solid-State Tunable Laser in the Visible," Chemical Physics Letters, vol. 160, No. 1 (Jul. 28, 1989) pp. 43-44.
D. Avnir et al., "Alcohol is an Unnecessary Additive in the Silicon Alkoxide Sol-Gel Process," J. of Non-Crys. Solids 192 (1987) 180-182.
CA Abstract 59509j, "Light-Conducting Systems," 74–Radiation Chem., Photochem., vol. 67 (1967) 5591.
Sakka, "Formation of Glass and Amorphous Oxide Fibers From Solution," Mat. Res. Soc. Symp. Proc. vol. 32 (1984) 91-99.
Dislich, "Thin Films from the Sol-Gel Process," Sol–Gel Technology, 50-79.
Kaufman et al., "Structural Changes along the Sol-Gel-Xerogel Transition in Silica As Probed by Pyrene Excited-State Emission," Langmuir, vol. 2, No. 6 (1986) 717-722.
Zhang et al., "Synthesis and Characterization of Silicon Oxycarbide Glasses," J. Am. Ceram. Soc., 73[4] (1990) 958-63.
Haruvy et al., Abstract, "Poling and Chemical-Binding of Glass-Embodied Chromophores in Supported Sol-Gel Thin-Film Glasses for Second Harmonic".
Haruvy et al., "Poling and Chemical-Binding of Glass-Embodied Chromophores in Supported Sol-Gel Thin-Film Glasses for Second Harmonic Generation".
Dislich et al., "Light Guide Systems for the Ultrasonic Region of the Spectrum," Angewandte, vol. 12(6) (1973) 439-516.
Fujii et al., "Absorption and Fluorescence Evidences for Stable Capsuling of Rhodamine B in Tetraethoxy Silane Xerogel," Chem. Exp. vol. 4[1] (1989) 1-4.

Primary Examiner—John C. Bleutge
Assistant Examiner—Margaret W. Glass
Attorney, Agent, or Firm—Arnold, White & Durkee

[57] ABSTRACT

The present invention relates to a method of preparing glasses from metal alkoxides. Glasses are crack-free and prepared rapidly in a single step. Optically clear polysiloxane glasses as thin films may be prepared in a matter of minutes. A glow discharge curing method is disclosed which rapidly cures a wide range of condensation polymers, including polyamide resins and polymethylsiloxane glass films. Fracture-free films up to 100 μm have been prepared. The glass films may be used as waveguides and to incorporate metals, donor-acceptor molecules and dyes. Stable, crack-free multiple-layered films may be prepared by the disclosed method which can be modified according to desired properties of the glasses.

37 Claims, 8 Drawing Sheets

FAST SOL-GEL PREPARATION OF GLASSES

BACKGROUND OF THE INVENTION

1. Field of the Invention

The invention relates generally to sol-gel glasses and a chemical procedure for their preparation. Preferred "crack-free" glasses are polymerized from substituted metal alkoxides having two or three hydrolyzable groups. Thin films up to 100 μ are typically obtained in a rapid single step process. The invention also relates to an accelerated curing method for condensation polymers by glow discharge over the polymer bulk.

2. Description of Related Art

Sol-gel techniques have been extensively investigated for more than two decades (Gottardi, 1982) and used to prepare glasses and ceramics for use in a wide variety of applications, employing various precursors, catalysts, additives and procedures. Sol-gel precursors most investigated have been prepared from siloxanes, especially tetraalkoxysilanes (Reisfeld, 1987). Titania, alumina (Kobayashi, 1988) and mixed glasses have also been investigated. Numerous chromophores have been incorporated into sol-gel produced glassy materials, laser-dyes in particular. The latter have exhibited promising characteristics for use in nonlinear optics (NLO), especially for laser systems (Reisfeld, 1989). Dye-embodying supported glass thin films have been prepared by sol-gel techniques, aiming at surface laser systems (Kobayashi, 1988), yet prolonged and complex processes are required to facilitate crack-free glasses of the desired properties.

Tetraethoxysilane is the favored precursor for the preparations of pure silica ($SiO_2$) glasses by the sol-gel method due to its moderate reaction rate. The water-to-siloxane molar ratios (MR) most commonly employed is 5:1 to 10:1. A co-solvent (e.g. ethanol) is regularly added to maintain a one-phase reaction solution, although it was recently demonstrated, in the sol-gel reaction of tetramethoxysilane, that the methanol produced by the hydrolysis was sufficient to maintain a single-phase at an early stage of the reaction:

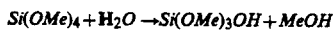

$$Si(OMe)_4 + H_2O \rightarrow Si(OMe)_3OH + MeOH$$

Following the partial or complete hydrolysis of the silicon-alkoxide precursor, polycondensation of the hydroxyl groups takes place via the si-O-si etheric bonds. The glassy matrix formed by this polymerization is capable of encaging large molecules (e.g. chromophores, enzymes) which have been introduced into the reaction mixture. However, during this stage of the sol-gel synthesis severe cracking and fragmentation of the formed glass are the common obstacles that impede the fabrication of articles and films in general, and supported films in particular. This is due to the extensive volume-contraction which accompanies the condensation reactions and the corresponding expulsion of the solvent and the condensation products. Many investigators have attempted to overcome this obstacle by using a wide variety of additives such as dimethylformamide (DMF), formamide, organic acids or surfactants. Even with these additives, however, an extremely slow and very cautious drying of the sol-gel glass is necessary for the survival of a fracture-free glass, making this synthetic route more of an art than a science.

The cracking problem is further aggravated where sol-gel glasses are cast onto a rigid support since the gelling matrix is no longer free to contract. Crack-free supported glass-films can be maintained by a surfactant, yet a high concentration (up to 3% in the final glass) is required. Its durability towards decomposition under conditions of high energy-density (e.g. solid-state laser) is questionable.

Although crack-free glasses from sol-gels have been prepared, the procedures are time-consuming and often complex. Of particular concern from a practical aspect is the undue amount of time required in curing glass thin-films on supported matrices. It is not unusual to dry polysiloxane films for periods of weeks to assure a quality glass. Such films, depending on conditions of drying, additives and process modifications have required from 6 to 45 days for complete drying to crack-free films (Hara, 1991).

SUMMARY OF THE INVENTION

The present invention addresses one or more of the foregoing or other problems by providing a method of preparing glass films which can be made as single or multiple layer thin films with a range of thicknesses. Thin films polymerized from metal alkoxide monomers are free of cracks and generally may be prepared in a few hours by curing at elevated temperatures. Alternatively, curing of the polymer films may be accomplished in a period of minutes using a glow discharge technique during the curing process. Guest molecules, including laser dyes and donor-acceptor molecules, are readily incorporated into the glasses produced by methods in accordance with the invention.

The invention is generally directed to a method of rapid preparation of crack-free glasses. A suitable metal alkoxide monomer is selected, polymerized during a hydrolysis step and subsequently cured. The inventors have discovered that through use of various reaction conditions one can provide films having desirable optical and/or mechanical properties.

Suitable monomers for polymerization include metal alkoxides such as silane alkoxides, barium, yttrium, copper or aluminum alkoxides, titanium alkoxides or alkoxides selected from other metal groups as well as mixtures of the aforementioned metal alkoxides. Similarly, single metal alkoxide oligomers or mixed metal alkoxide oligomers may be used. Suitable substituted alkoxides include, for example, methyl trimethoxysilane, dimethyl dimethoxysilane, ethyl triethyloxysilane and so forth. The composition of the resulting polymer glass will depend on te structure of the monomer. Methyl trimethoxysilane can be used to provide polymethylsiloxane (PMSO) glasses. In order to obtain glasses with desirable mechanical properties, such as rigidity, flexibility or toughness, the monomer selected preferably has two or three hydrolyzable groups. Aluminum alkoxides thus may have for example two or three methoxyl groups. Silanes that are useful include monomers with three alkoxy groups, for example methoxyl, ethoxyl, isopropoxyl, butoxyl and the like, with the remaining positions occupied by a nonhydrolyzable group. Such nonhydrolyzable groups may include alkyls such as methyl, ethyl, etc. or other groups which do not participate in the hydrolysis reaction, such as aromatic substituents. However, substituent groups on silane monomers need not be inert to any reaction. The inventors have discovered that certain modifications in glass preparation allow trimethoxy or dimethoxy silane monomers with hydrogen in the remaining position(s), e.g., SiH(OMe)$_3$, to be used, resulting in virtually pure silicon oxide glasses.

Hydrolysis of the selected monomer is preferably accomplished at an elevated temperature. Although optically clear glasses have been obtained when hydrolysis of alkoxysilanes is conducted at room temperature or temperatures up to 60° C., phase separation may frequently occur during the hydrolysis stage. The inventors have discovered that elevating the temperature will result in a single rapidly formed viscous phase which may be subsequently cured to form a crack-free glass or film. Polymethylsiloxane films, for example, may be spun cast into crack-free thin films from polymer solutions formed at 80° C. from methyltrimethoxysilane monomer. Other monomers, for example ethyltriethoxysilane, methyltriethoxysilane, and the like will also form single phases at these temperatures, although when the alcohol formed from the reaction is ethanol rather than methanol, more efficient reactions are accomplished using temperatures around 90° C.

Thin films prepared from monomers such as alkoxy substituted silanes by processes similar to the aforementioned methods have traditionally been referred to as sol-gel glasses or sol-gels. In fact, the formation of polymers described in the present invention are formed mainly by polymerization rather than a sol aggregation. It is therefore understood that references to sol-gel methods or to sol-gels are not intended as a limitation on the characterization of the glasses or thin films prepared by the aforementioned methods.

The inventors have discovered that glassing out, that is, fast aggregation forming precipitating particles during polymerization, can be prevented when low water-to-monomer molar ratios (MR) are employed. Ideally this is in a "near-stoichiometric" range which is understood to mean the amount of water calculated from the overall reaction equation. By way of example, the following equation is shown for the hydrolysis/polymerization of methyl trimethoxysilane.

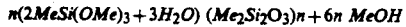

$$n(2MeSi(OMe)_3 + 3H_2O) \; (Me_2Si_2O_3)_n + 6n \; MeOH$$

A preferred amount of water to use in this reaction relative to the monomer is 3 moles/2 moles, or 0.2 g/g (MR = 1.5).

Fracturing of cast gels during the curing process has been a perennial problem. This arises because contraction of the rigid gel occurs as products of the hydrolysis and the condensation reactions are expelled from the glass while it crosslinks. There is a significant decrease in volume and dimensions taking place during the drying stage of the sol-gel derived glass resulting in extensive fractures. This problem is overcome by minimizing the volume of the reactants, illustrated for example by using trimethoxymethyl silane monomers. These are preferred over triethoxysilane which have a larger molar volume.

Under the aforementioned conditions, hydrolysis and polymerization of the monomer generally occur simultaneously. A catalyst is not always necessary, but is preferably used to catalyze polymerization of silane monomers such as ethyl triethoxysilane, methyl trimethoxy silane and the like. Inherently rapidly polymerizing monomers, for example, trialkoxysilanes, typically do not require a catalyst and in fact may preferably be slowed by addition of other components or by modifying reaction conditions. Acid catalysts such as hydrochloric acid are typically used at approximately $10^{-2}$ molar. There are however situations where a basic catalyst may be preferred, for example, when particular functional groups are present on molecules incorporated into a polymer film or glass. An example is pyridine or other groups carrying nitrogen which may form charged species that tend to interfere with polymerization due to a tendency to cause sol aggregation. Alternatively, higher miscibility to obtain higher concentrations within the polymer matrix may be desired. Although ammonium hydroxide can be used, low reaction rates have been observed. A preferred catalyst is dimethylamine. Its pKb is higher than ammonia. At concentrations between $10^{-2}$M up to as high as 4.4M, miscibility of the laser dye Pyridin-1 in aqueous and hydrophobic phases is increased, at least in the early stages of condensation. After most of the water is consumed the base protonation reaction is reversed. The volatile amine is expelled from the reaction, thus slowing the reaction rate. Polymethylsiloxane glasses incorporating Pyridin-1 laser dyes prepared using dimethylamine catalysis which were cast onto supports and dried similarly to those prepared by acid catalysts had the same crack-free properties as those found with acid catalysis. Thus both types of catalysis, acid and base, may be used to prepare crack-free glasses and in some cases either type of catalyst may be used.

One hydrolysis product of metal alkoxide monomers is an alcohol. When trimethoxysilane monomers are used this product is methanol, whereas if ethoxy substituents are present the product will be ethanol. By conducting the hydrolysis/polymerization at elevated temperatures, alcohol produced during the reaction is readily and rapidly removed from the reaction. As examples, methanol is rapidly and efficiently removed at 80° C. while efficient removal of ethanol is accomplished at 90° C. In preferred practice, in contrast to recipes commonly used by practitioners, limited amounts of water are mixed with monomer. Hydrolysis from the added water accounts for only about 1.5 moles of alcohol for each mole of monomer. Additional alcohol, depending on the substrate monomer, arises mainly from further condensations between the alkoxysilane and the hydroxyl groups on the silane resulting from the initial hydrolysis.

It will be appreciated that the hydrolysis and the polymerization reactions are occurring at the same time within the solution although varying degrees of hydrolysis will precede certain stages of polymerization and crosslinking. In one embodiment of the invention, a substituted silane monomer in the presence of an appropriate amount of water is heated to a temperature of about 60°–90° C. A single phase is formed and after the formed alcohol has distilled off, the viscous solution is formed and then cured. Curing is a process in which completion of crosslinking of the polymer within the gel occurs, adding to the rigidity and hardness of the gel. This commonly requires several hours to several days at room temperature depending on numerous factors such as thickness or MR. The time may be shortened considerably by curing, for example, at elevated temperatures.

Curing of a hydrolyzed/polymerized metal alkoxide monomer may be accomplished in situ or subsequent to a forming process such as casting. Thus in a further aspect of the invention viscous polymer solutions formed from the hydrolysis polymerization reaction are cast onto substrates. Such substrates may include rigid or flexible surfaces such as glass, metals, or flexible or inflexible polymers. Sol-gel glasses formed on rigid supports are apt to cause problems due to the formation of cracks during the curing process as the polymer contracts.

Crack-free supported glass films have been maintained by others by the addition of a surfactant at relatively high concentrations, for example up to 3% in the final glass. However, surfactant embodied in the final glasses may decompose when employed for high energy density applications, for example for solid state lasers, adversely affecting performance. However, the inventors have discovered that the new method of preparing metal alkoxide polymers provide solutions particularly amenable to spin-casting without addition of additives such as surfactants, DMF or similar drying control agents.

In yet another embodiment of the invention, ethanol is included as an additive during polymerization of trimethoxysilane monomers or other similar monomers which produce only methanol as an alcohol product and also have one or two sites occupied by hydrogen. Addition of 5-10% by weight ethanol with respect to the monomer maintains slower drying during the spin-casting stages. Methanol formed in the reaction mixture evaporates quickly whereas ethanol with a higher boiling point, when added, evaporates more slowly. Addition of ethanol is not required for mixed recipes comprising silane monomers substituted with one or more ethoxy groups as ethanol is produced during the hydrolysis reaction. The presence of methoxy groups is required to reduce the volume expansion. Other suitable substituted silanes include dimethoxyethoxysilane and diethoxysilane. Mixtures of different substituted ethoxy and methoxy silanes are also suitable. So long as about 5% ethanol is produced in the reaction addition of ethanol is not required.

The inventors have discovered that casting sol-gels prepared from alkoxysilane monomers between two polymer layers allows sufficient flexibility of support so that a certain amount of mobility on the cast polymer enhances relaxation processes and eliminates cracking. Spin casting of the trialkoxysilane polymers between two polymer layers has several effects. These include slowing evaporation of the alcohol from the gel during the curing process, retarding oxygen diffusion into the polymer layer, and providing a reinforcing support for the upper surface of the polysiloxane glass layer. Reinforcing provided by a flexible support appears to inhibit initiation of new cracks as well as propagation of existing ones, thus allowing a healing process to occur. Additionally, by carrying out the sol-gel reaction and the spin-casting process under inert atmosphere such as nitrogen, argon, or other inert gases, most of the early oxygen-induced crosslinking reactions may be prevented. However, addition of ethanol, the use of flexible support layers, or the use of an inert atmosphere are by themselves insufficient to prevent cracking, although addition of ethanol is not necessary with ethoxy substituted silane monomers. Yet by using all three to prepare films using trimethoxysilane monomer, crack-free polysiloxane glasses may be obtained after curing for only a few hours at ambient temperature under an inert atmosphere.

In yet another aspect, complete curing may be accomplished within a few additional hours at slightly elevated temperatures, typically 60°-65° C. in an oven. The final curing stage of polymer prepared from trialkoxysilanes apparently allows slow diffusion of oxygen through the sandwich gel layers so that additional hydroxyls are formed along with further crosslinking of the glass. This leads to an essentially pure silica glass composed of silicon and oxygen.

It will be appreciated that the water to monomer ratio, that is the MR ratios, in polymers used to prepare glasses may be optimized or tuned to allow fast polymerization while minimizing crosslinking. By optimization or tuning is meant adaptations of conditions for preparation of films with desired properties. For example, trimethoxysilane films are best prepared using an MR of 1.0 or less, most preferably about 0.95. For example, methyltrimethoxysilane films are best prepared using an MR of about 1.5 or less, most preferably about 0.95. Hydrolyzed/polymerized siloxane solutions may be allowed to cure in situ in bulk, formed as films or fibers or cast on supports to prepare thin films.

In yet another aspect of the invention, multiple layered thin films may be prepared. The procedure includes sequential casting of the glass films. For example a film may be spun-cast onto a substrate followed by spin-casting of a second film on top of the first formed glass and so forth. One or more of the multiple-layered thin films may be conveniently modified to produce a change in refractive index. This may be accomplished by modifying either the chemical constitution of the polymer by adding, e.g., heavy atoms or conjugating groups, or by modifying the density of the film. A convenient method of altering a refractive index is to modify the silane monomers used to prepare the polymer. Typical modifications include substitution with aromatic groups including monocyclic, polycyclic and heteroaromatics. A wide variety of groups may be used, and, if desired, selected not to react under conditions of polymer preparation or to interfere with subsequent use. The refractive index may also be altered by incorporating certain guest molecules or atoms within the polymerized film. Thus various dyes such as Rhodamine-6G, Coumarin-153, Polyphenyl, and the like could be included in the polymerization solution of water and monomer.

A further aspect of the invention includes glasses, thin films, and multiple-layered films or glasses prepared by the aforedescribed methods.

Yet another aspect of the invention includes a method of curing polymers using a direct current electric field. This method involves glow discharge induced field across the polymer bulk during the curing process. The inventors have discovered that this is a surprisingly rapid method of curing polymer films such as spin-cast polymethylsiloxane or polyamic acid, precursor of polyimides. Curing at room temperature has been accomplished in short periods, often as short as 10-20 min for polymethylsiloxane glasses and as short as 60 min for polyamic acid resins. Thin films up to 100 micrometers have been rapidly cured by this process.

Glow discharge curing may be applied to virtually any condensation polymer or any polymer resulting from a condensation reaction in which crosslinking or completion of polymerization is required for curing. Typical polymers include polyesters, phenol formaldehydes, melamine, formaldehydes or, in preferred practice, polyamic acid resins, polyoxysilanes or substituted polyoxysilanes such as polymethyl siloxane. Glow discharge curing is not limited to spun cast films but may be applied also to fibers or shaped articles. The method is especially useful for polymer films approximately 1-100 micrometers in thickness.

Glow discharge is preferably conducted by setting up an induced electric field over the polymer surface. Typical voltages across the polymer bulk are about 3-12 megavolts per centimeter, although this may vary depending on the polymer. The inventors have discovered that an unusually high electric current through the polymers, typically 10-20 microamps across thin film polymers prepared from substituted siloxane monomers, is associated with this rapid curing procedure.

Glow-induced sol-gel curing may result in the formation of a hydrophilic surface on the polymer film. Without application of glow discharge, polymer or gel films allowed to cure under ambient conditions usually become hydrophobic. Hydrophobic films typically are manifested by contact angles which are as large as those observed on paraffin film. Hydrophobicity may cause gliding of successively cast films. Glow discharge cured films do not have large contact angles, thus indicating a fair degree of hydrophilicity. Hydrophilicity of films cured by glow discharge is controlled by either the content of water or other condensate molecules or by the rate of curing.

Additionally, multilayered assemblies of hydrophilic sol-gel films may be prepared by glow discharge curing. Hydrophilic gel surfaces will stick together better than hydrophobic gel surfaces and are therefore useful for such applications as multilayer wave guides and surface lasers.

Glow discharge curing of polymer films may be carried out at almost any desired temperature. For poly-substituted siloxane films, this is usually at room temperature, that is, about 20°-25° C. Lower temperatures may be used, and lower limits are constrained only by the mobility of the water or other condensate within the matrix. Thus in particular cases, extremely low temperatures, e.g., −50° C. may be used to cure articles formed to extremely accurate dimensions for intended use at this temperature, e.g., space use. In other cases, elevated temperatures may be preferred, for example, to accelerate curing rates or to prepare articles in accurate dimensions for use at elevated temperatures.

Curing of the hydrolyzed/polymerized metal alkoxide monomer may be carried out by allowing the polymerized solution to "air-cure" by standing at ambient or elevated temperature in an inert atmosphere, controlled humidity or at other than atmospheric pressure. By way of illustration, polymethylsiloxane gels are preferably cured at a temperature of about 60°-70° C. under normal atmospheric conditions.

In yet another aspect of the invention guest molecules are included in the polymer glass matrix. In particular, high concentrations of donor-acceptor molecules may be included in these matrices. Examples include compounds such as p-nitroaniline, 4,4'-diamino diphenyl sulfone, 4,4'-aminonitroazodiphenyl, or 4,4'-dimethylamino nitrostilbene. Guest molecules may also include laser dyes, such as Rhodamine-6G, Pyridin-1, or Coumarin-153 Where high concentrations of guest molecules within the matrix are desired certain modifications of the sol-gel polymerization process have been found desirable. Thus it is preferred to slow evaporation of the alcohol, methanol for example arising from methoxyl group hydrolysis, in the sol-gel until sufficient molecular weight and viscosity have been obtained. This may be conveniently carried out by conducting the first 5 min of polymerization in a sealed vial, opening the vial and monitoring methanol loss until approximately 350 milligrams per gram of monomer is obtained. This compares with the regular process loss of 500 milligrams per gram of monomer. Limited loss of methanol with these types of guest molecules within the matrix has the effect of substantially reducing association of these molecules within the polymerization solution. Consequently the formation of solid crystallites and subsequently inhomogeneous film is prevented. Other methods of slowing down or counteracting fast evaporation of methanol from the polymerization solution include adding less volatile solvents, miscible organic solvents such as ethanol, higher alcohols, acetonitrile, or the like, or water immiscible organic solvents such as toluene.

The invention also includes polymers produced by the aforementioned method of producing glass films. These are crack-free, optically clear polymers. These polymers are preferably polysiloxane or substituted polysiloxane polymers and will have hydrophobic or hydrophilic surfaces if air-dried or glow discharge cured respectively.

Films prepared b the aforedescribed methods, particularly polymethylsiloxane and polysiloxane films, are useful as optically clear glasses or may be used as waveguides, particularly multilayered assemblies, for example, by incorporating laser dyes into the monomer solutions used for polymer preparation of an internal layer. Many uses of the fracture-free films are envisioned, including incorporation of molecules that can be reversibly oriented by an applied electric field to produce a switchable non-linear optical device, optical waveguides, surface or amplification lasers produced by combining a waveguide structure with a laser dye incorporated in the appropriate layer, surface or amplification laser with sensitizing dye on top and bottom layers of waveguide structure and lasing dye in the center layer, waveguide structure with incorporated dye to capture light and convert it to fluorescent wavelength for edge sensitization of photovoltaic or photogalvanic cells, like the foregoing except applied to photoresistor or phototransistors; with incorporation of appropriate phosphors or dyes, optical readout of electron beam or other radiation such as applied to CRT technology or spatial detection of x-rays or equivalent radiation, modifications of PMSO or equivalent condensation polymer film surfaces by simultaneous glow discharge curing and electrochemical polymerization of appropriate incorporated electropolorizable monomers, including conducting polymers, cladding of fibers, surfaces of other articles (formed, molded, spherical), optical data storage or readout, fluorescent or optical absorption based display or ornamentation application, enhanced visualization of radioactivity with incorporation of appropriate phosphors or dyes, incorporation of biologically active species such as enzymes with or without absorption or emission of light.

DETAILED DESCRIPTION OF THE PREFERRED EMBODIMENTS

The present invention is a rapid, single-step method of preparing what are commonly known as sol-gel glasses, supported films in particular. The invention is illustrated in detail with preparation of glasses prepared from alkoxysilane and alkylalkoxysilane monomers and indicates variations which allow flexibility in achieving desired polymer properties, depending on the application. Especially desirable are fracture or crack-free glasses that are rapidly prepared, some in a matter of minutes.

Although the method may be varied, the inventors have shown that preparation of crack-free glasses from methyl alkoxysilane monomers depends on the maintenance of a single phase during the hydrolysis/polymerization process. Thus the practitioner will usually mix a lower molar ratio of water to monomer, about 1:1, and then heat to about 80° C. This accelerates hydrolysis and polymerization.

This is conveniently accomplished by heating which has the effect of accelerating hydrolysis and polymerization. The method produces alcohol from hydrolysis of the alkoxide group. Methoxyl groups are used because methanol is produced which is easily removed, readily distilling off at the temperatures employed for the reaction. Removal of methanol maintains a low volume for the reaction, considered a factor in efficient polymerization. At 80° C., a viscous one-phase polymer solution suitable for casting or forming is obtained after about 5 min. At 70°-72° C., the same viscous solution is obtained after about 15 min.

Figure 1:
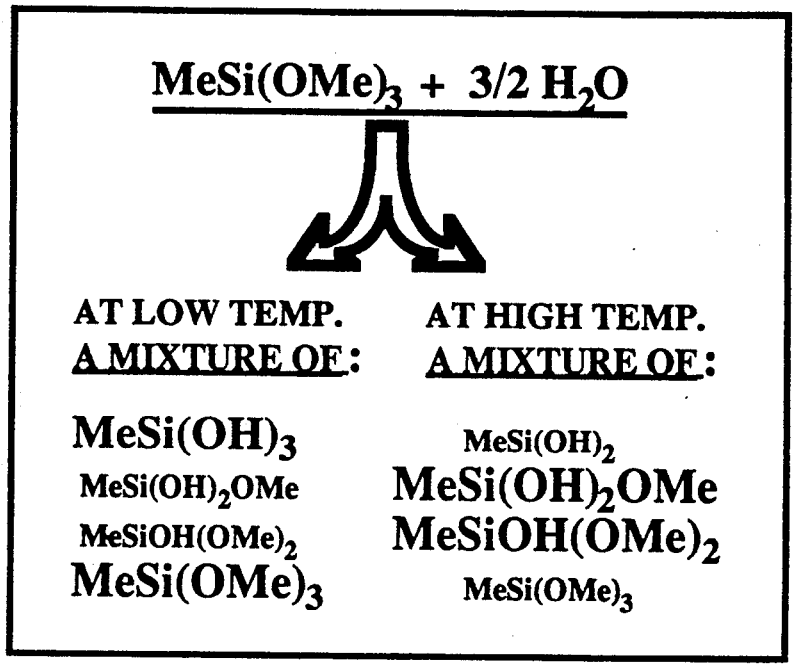
FIG. 1 shows major and minor products in the three stage hydrolysis of MeSi(OMe)$_3$ at low MR with major products denoted by larger font.
Figure 2:
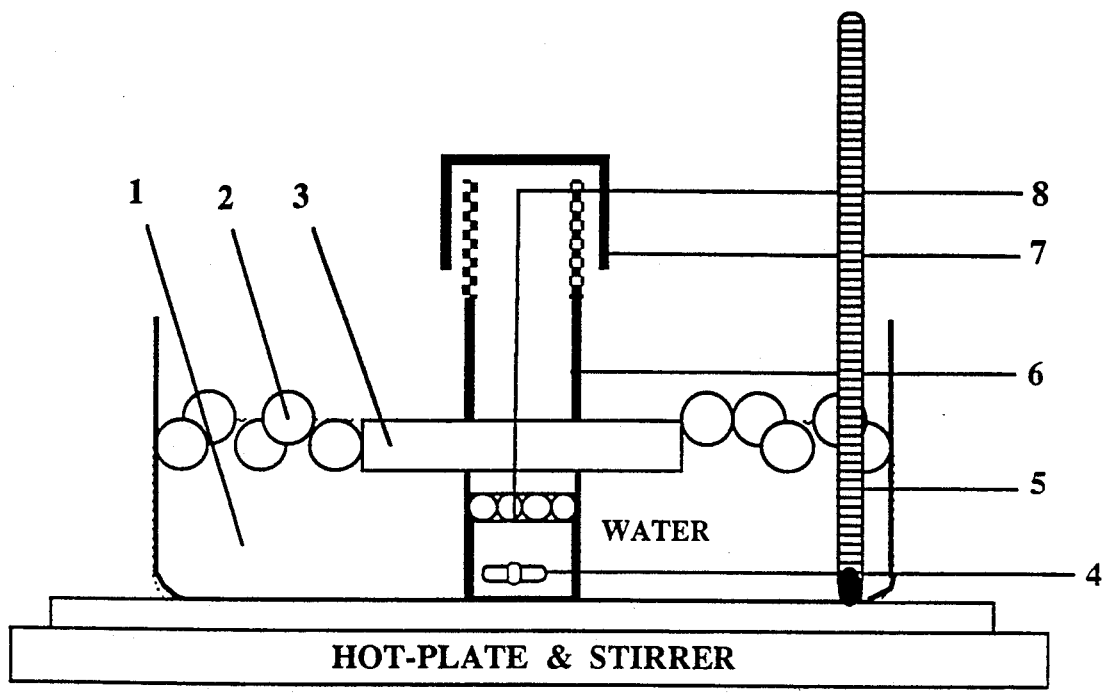
FIG. 2 shows a typical set-up for hydrolyzing and polymerizing metal alkoxy monomers used to prepare glasses and thin films. 1 is a water bath at constant temperature; 2 are hollow beads; 3 is a styrofoam bar; 4 is a magnetic stirring bar; 5 is a thermometer; 6 is a reactor (e.g., a 1 dram vial); 7 is a pressure regulator (e.g., a cup); and 8 is a viscosimeter (e.g., bubbles).

The composition of a methyltrimethoxysilane water mixture is quite different, depending on the temperature. At high temperatures less of the completely hydrolyzed species are present. This determines phase separation and the flexibility of the polymer formed, in turn leading to better quality cast films where curing takes place while the bulk polymer retains some flexibility. FIG. 2 illustrates the species present at high and low temperature hydrolysis/polymerization.

As a general guideline, polymer solutions formed from methyltrialkoxysilane monomer are ready for casting into films after about 500 mg methanol per g monomer has been removed from the solution. It is convenient to monitor methanol loss gravimetrically, although volumetric determinations or measurement of density changes in the solution would also be applicable.

Similar methods are applied in producing films from silane monomers. The hydride substituent of trimethylsilane oxidizes so quickly when the monomer is mixed with water that certain precautions are taken to assure even polymerization and subsequent grainless, crack-free glasses after drying. Trimethylsilane is mixed with water at a MR of about 0.95 under an inert atmosphere such as nitrogen, argon or helium. Any convenient nonoxidizing atmosphere could be used which will prevent excessively rapid oxidation of the hydride. Even so, the reaction is quite rapid, usually less than one minute at room temperature. The rate would likely be slowed somewhat at lower temperatures, although care should be taken to assure that the reaction mixture maintains a single phase.

Glasses are generally formed after hydrolysis/polymerization followed by a curing process. Curing entails several reactions, usually some hydrolysis, further polymerization and formation of crosslinks. For many siloxane glasses, particularly films, formed from alkoxy or alkylalkoxy monomers, curing at room temperature or elevated temperatures will provide satisfactory crack-free films. The process is accelerated at the higher temperatures, and may require up to a few days at room temperature, depending on composition and thickness. Curing of polymethylsiloxane films at 70° C. takes about 2-3 hrs for films of 1-25 $\mu$m thickness. Thermal curing is commonly used, but other methods could be employed including curing under reduced or increased pressure varied humidity.

Extremely rapid curing, often in minutes, is achieved with an electric field discharge method. This method works for all types of condensation polymers. Polymethylsiloxane films are cured by casting over a rigid surface that will act as an electrode. A strong electric field is generated near the polymer to the point of arcing. Normally, polymethylsiloxane polymers do not conduct current, but large fields applied to the bulk polymer generate currents above 10 $\mu$amps. Applied to a 10 $\mu$m freshly cast polymethylsiloxane film, such a current completes curing in several minutes, contrasted with 2-3 hrs at 70° C. under normal atmospheric conditions. This method of glow discharge illustrates the principle of applying an electric field across the bulk polymer during polymerization. Ion movement generates the observed current which can be varied with the field applied to alter polymer surface properties such as hydrophilicity. Variations in field intensity, intermittent glow discharge or similar changes could be made.

Regardless of the forming procedures used prior to curing the polymer, fibers, films or shaped articles formed by the methods herein can be cured free of cracks or fractures. Films are particularly useful for many purposes, including optical use. Siloxane films are best hydrolyzed/polymerized at room temperature or below and generally would not be amenable to rapid curing by glow discharge. Siloxane films prepared by spin-casting trimethylsilane monomer are optically clear and virtually identical to $SiO_2$ glasses after curing. While glow discharge may not be desirable for acceleration of curing in these films, it could be used to alter surface properties to enhance hydrophilicity. Thus multilayers of these films could be more easily fabricated with less "gliding".

Materials

Monomers tetraethoxysilane (TEOS), tetramethoxysilane (TMOS), methyltrimethoxy-silane (MTMS), dimethyldimethoxy silane (DMDMS), chlorotrimethylsilane (CTMS), trimethoxysilane (HTMS) and diethoxysilane (HDES).

Chromophores: Polyphenyl-1 (PP), Coumarin-153 (COU), Rhodamine-6G (RH), Qui and Pyridin-1 (PY) were purchased from Lambdachrome; p-nitroaniline (PNA) and 4,4'-diamino diphenyl sulfone (DDS) were purchased from Aldrich.

Catalysts: hydrochloric acid (Baker, AR) and dimethylamine (Kodak, AR).

Donor-acceptor molecules incorporated in the sol-gel matrices were p-nitroaniline (PNA), and 4,4'-diamino-diphenyl sulfone (DDS) from Aldrich (AR) and 4,4'-dimethylamino nitrostilbene (DANS) from Kodak.

Preparation of the Support Glasses

Glass supports were precleaned with detergent, washed with deionized water, dried and immersed for a period of 24 hrs in a 6N NaOH solution, or in a mixture of 1:10 $H_2O_2$ (30%) and $H_2SO_4$ (98%). Then, they were rinsed thoroughly with deionized water, dried and kept dry until use.

Set-Up

The hydrolysis and polymerization were carried out using the experimental set-up schematically described in FIG. 2. The process "reactor" can be a disposable vial (1-4 drams) equipped with a screw-cap. Temperature control and the stirring of reactants were maintained by a water-bath/stirrer-hot-plate assembly and a magnetic bar in the reaction vial. As a safety precaution necessitated by the occasional splashing during vigorous reaction of the alkoxy monomers at elevated temperatures, the reactions were started with tightened screw-cap which was gradually released (cf. FIG. 2) to allow evaporation of volatile products.

Monitoring Polymerization and Casting

The progress of the hydrolysis reaction was monitored gravimetrically by recording the weight-loss of the reaction mixture following the distillation-out of the alcohol produced therefrom. The propagation of the condensation-polymerization was monitored by the size and the duration of the bubbles produced by the alcohol boiling out from the viscous polymerizing solution.

Films were spin-cast on the support using a spin-coater (Headway Research, Model 2-EC101-R485). The pretreated support was attached to the spinner chuck. At the appropriate stage of condensation, the polysiloxane viscous liquid was poured onto the support, and spin-cast for 240 s at ca. 1000 RPM. The samples were left to cure until the surface was no longer sticky. Typical curing duration was a few hours (at 60°-70° C.) or a few days (at room temperature, ~50% relative humidity).

Determination of Film Thickness

The thickness of the dry films incorporating chromophoric material was calculated from the measured absorbance of the dye in the glass, the extinction coefficient, the dye concentration and the density of the glass film (measured to be ca. 1.3 $g/cm^3$). Direct measurements were carried out with an Inverted-Stage Epifluorescent Video Microscope (Leitz Fluovert; Rockleigh, N.J.).

Spectroscopy

Spectral measurements of chromophore molecules were carried out either on supported glass thin-films embodying them or on solutions. Aluminum slabs were used as support for the films subjected to corona glow discharge. Ultraviolet-visible absorption spectra were recorded on HP-8481A Diode Array Spectrophotometer. Fluorescence spectra were recorded on a SPEX Fluorolog with a 450-W Xenon lamp and a TE-177-RF photomultiplier (Products for Research, Inc.).

EXAMPLE 1

Preparation of Polymethylsiloxane Glass Films

One g of methyltrimethoxysilane was heated to 80° C. with 0.2 g water containing $10^{-2}$M HCl (monomer to water molar ratio of 1:1.5) in a vessel equipped with stirrer and temperature control, as shown in FIG. 2. Phase merging of the reactants occurred in less than a minute. The progress of the hydrolysis was monitored gravimetrically by recording the weight-loss of the reaction mixture as methanol produced by the reaction was distilled out of the solution. The methanol evaporation leveled off after about 5 min and the viscous mixture, having lost about 550 μmg methanol, was spun cast onto a glass support precleaned as described under Materials and Methods. Spin-casting was performed as described under Polymerization and Casting, at 1000 rpm for 240 sec. The cast film was allowed to cure at 70° C. until the surface was no longer tacky, about 2-3 hr. Films were typically 10-25 μm but were obtainable up to 100 μm by tuning viscosity of the cast gel and/or the spinning rate during casting of the film.

Figure 3:
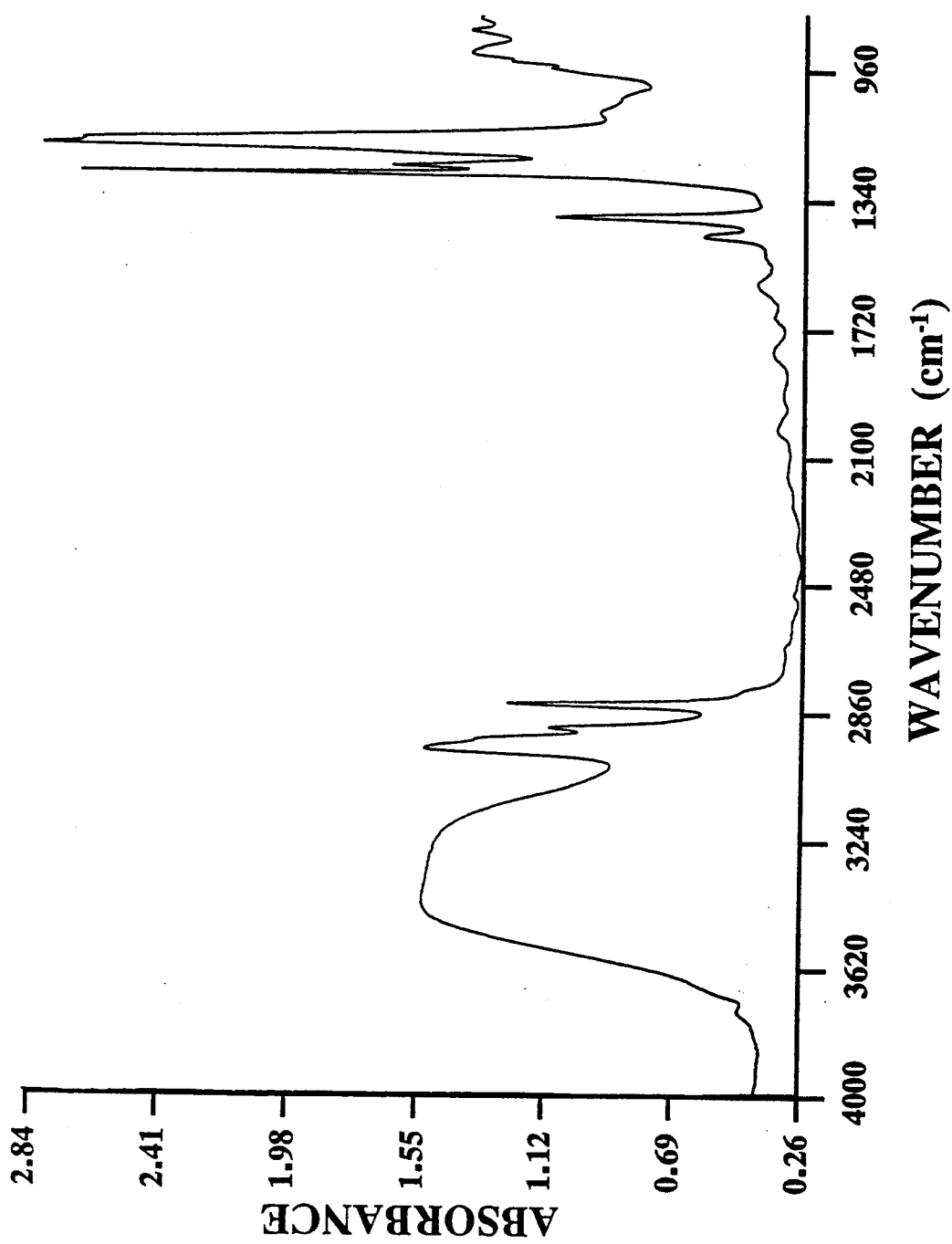
FIG. 3 is a FTIR spectrum of sol-gel (MTMS) prepared polymethylsiloxane thin-film on an aluminum support.

The film was crack-free and optically clear with the exception of methyl group absorption in the 2800-3200 $cm^{-1}$ region of the spectrum. The FTIR spectrum is shown in FIG. 3.

Figure 4:
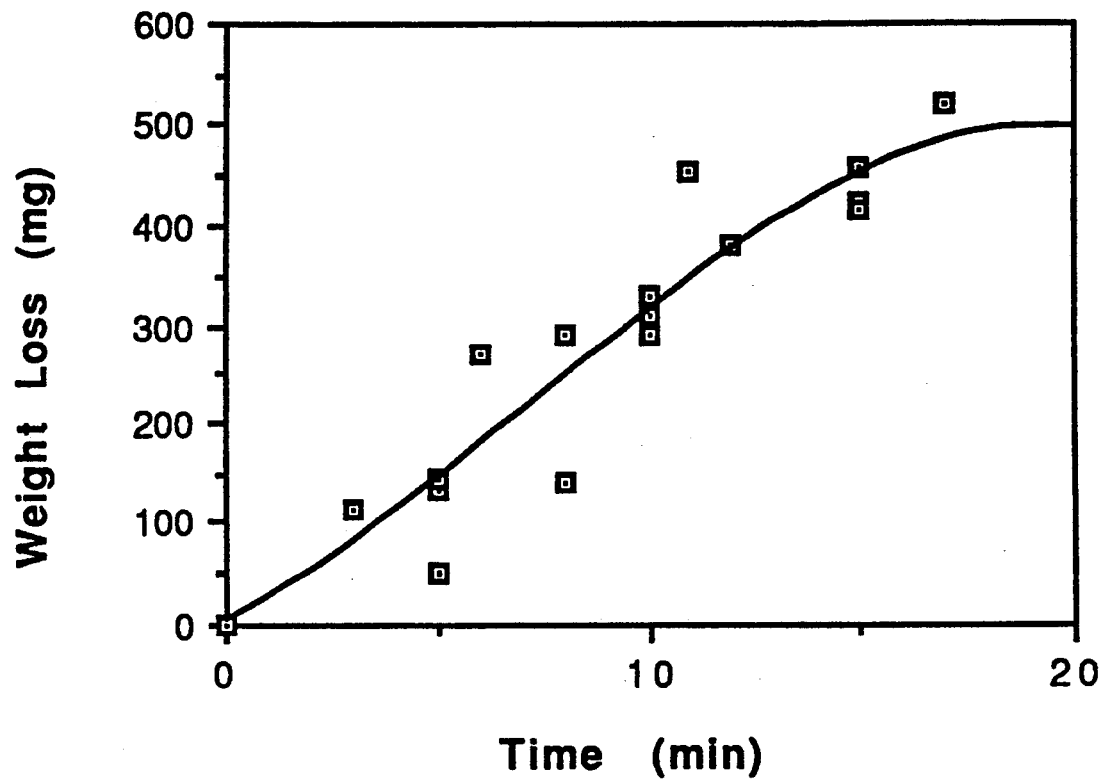
FIG. 4 shows weight loss from a MTMS gel due to evaporation of methanol at 70°-74° C.

FIG. 4 shows the time course of methanol loss during the hydrolysis/polymerization run at 70°-74° C. The weight loss of methanol levels off after about 20 min.

EXAMPLE 2

A Crack-free polymethylsiloxane film was prepared as described in Example 1 except that 0.3 g of methyltrimethylsilane was used with MR at 2.25. Curing was achieved in about 1-2 hr at 70° C.

EXAMPLE 3

Multilayered Polymethylsiloxane Glasses

Successive spin-casting of several layers of PMSO on a support according to the procedure of Example I resulted in a multilayered assembly. The sol-gel and drying processes of a single-layer was applied in a straight-forward manner to the preparation of a multilayered assembly (1"×1") of total thickness up to 50 μm. Thicker or larger dimensioned films required an extended period of slow drying at room temperature. A 81 μm thick film was cured for 2 days prior to continued curing at 70° C. for an additional day.

Polymethylsiloxane Waveguides

In order to convert a multilayer assembly into an efficient waveguide, a supported three-layer assembly was prepared in which the middle layer had a higher index of refraction than the other two, which thus serve as cladding layers for the middle one: $n_2 > n_1$ and $n_2 > n_3$. This increase in the index of refraction was attained either by incorporation of a dye, by maintaining high concentration of dye embodying in the middle-layer, or by incorporation of monomers carrying aromatic groups (e.g. phenyltriethoxysilane) into the middle layer. The waveguide property was exemplified in measuring front-face vs. right-angle fluorescence of three-layer assembly comprising a laser-dye in its middle layer: in spite of the fact that the right-angle dye-area was three orders of magnitude smaller than that of the front-surface ($-10$ μm vs. $\sim 10$ mm), the fluorescence intensities differed only by a factor of 10. This indicated that in such an assembly, most of the fluorescence intensity was guided through the dye-layer and only a small portion came out through its surfaces. This property may favor lasing in the dye-layer if sufficient pumping power is applied and appropriate cavity conditions are accomplished.

A slight increase in the water-to-siloxane molar ratio was required to ensure proper adherence between the layers when multilayered films larger than 1"×1" were prepared. Apparently the surface of cast PMSO films rearranges in order to match the environment it is facing: the surface of a PMSO gel which was cast onto Parafilm TM (American Can Company) and separated from the support after curing was found to be quite hydrophobic (contact angle>86° C.) while that cast onto cellophane were hydrophilic (contact angle<37° C., suggesting a double-backbone chain construction for PMSO. Such a polymer is capable of turning either its hydrophobic or hydrophilic side towards the surface. Hence, the gel surface exposed to air apparently becomes hydrophobic, allowing some gliding of the successive gel-layer on its methyl-rich surface. This manifests in a few cases (on large supports only) in inhomogeneous appearance of the second and third layers.

EXAMPLE 4

A crack-free multilayer polymethylsiloxane film was prepared as described in Example 1 using 0.22 g of methyltrimethoxysilane, MR of 1:1.65 for both upper and lower layers of a three-layer film. The middle layer additionally contained 2 mg of laser dye Pyridin-1 added to the monomer water mixture. Layers were formed by casting layers after a viscous mixture had formed.

EXAMPLE 5

A triple-layer film was prepared as described in Example 3. Top and bottom layers were prepared with MR 1.65 using 1.0 g MTMS. The top layer additionally contained 2 mg laser dye-QUI. The middle layer was of MR 1.65 was prepared from 0.9 g MTMS, 0.1 g Phenyl-TMS and 2 mg laser dye Coumarin-153.

EXAMPLE 6

A multi-layer film was prepared as in Example 5 from 0.9 g trimethoxysilane monomer, 0.1 g diethoxysilane and 0.14 g water. The water to siloxane molar ratio was approximately 0.95.

EXAMPLE 7

Fast Preparation of Polysiloxane Glass Films

Trimethoxysilane, 1 g, was mixed with 0.14 g water (water to monomer molar ratio of 0.95) and 0.05 g of ethanol under a nitrogen atmosphere at 25° C. After about one min the temperature was raised to 70° C. for two minutes. The progress of the hydrolysis and polymerization reaction was monitored gravimetrically and/or by visual observation of the polymer, as described in the Polymerization and Casting section. The viscous solution was then spun cast onto a polymethylsiloxane layer and immediately covered with another layer while maintaining an inert atmosphere of argon.

FTIR spectra of the prepared single-layer polysiloxane thin-film showed almost complete absence of methyl groups.

The effect of conducting the hydrolysis/polymerization reaction without an inert atmosphere is shown in Table 1. Table 2 indicates that prevention of oxidation contributes to the preparation of crack-free films.

TABLE 1

HTMS Fast Sol-Gel Experiments. a. Ambient Atmosphere

| No. | H$_2$O/HTMS[a] wt/wt | mol/mol | HCl (M)[b] | Temp. (deg C.) | Results and Observations |
|---|---|---|---|---|---|
| 1 | 0.22 | 1.5 | $10^{-2}$ | 70 | Gelling complete within seconds. |
| 2 | " | 1.5 | $10^{-2}$ | 25 | " |
| 3 | " | 1.5 | — | 25 | " |
| 4 | " | 1.5 | — | 0 | " |
| 5 | 1.15 | 1.0 | — | 0 | Viscous syrup within a few min. |
|   | " |     |   |   | Gels on the support before spinning. |
| 6 | 0.14 | 0.95 | — | 0 | Viscous syrup within a few min. |
|   |      |      |   |   | Gels on the support + Phase separation. |
| 7 | " | 0.95 | — | 0 (1') | Gelling at 80° C. within a few sec.[c] |
|   |   |      |   | 80 (1') | Phase separation occurred while gelling. |
| 8 | " | 0.95 | — | 25 (1') | Gelling at 80° C. within a few sec.[c] |
|   |   |      |   | 80 (1') | No phase separation observed. |
| 9 | " | 0.95 | — | 25 (1') | Viscous (70° C., 2 min). Cast at 400 mg Wt. loss |
|   |   |      |   | 70 (~2') | Gels on the support before spinning[d] |
| 10 | " | 0.95 | — | 25 (1') | Viscous (70° C., 2 min). Cast at 380 mg Wt. loss |
|    |   |      |   | 70 (~2') | Clear film forms. Cracks within a few min[d] |
| 11 | " | 0.95 | — | 25 (1') | Same as #10: Cast between PMSO layers[e] |
|    |   |      |   | 70 (~2') | Clear film forms. Cracks spread slowly. |
| 12 | " | 0.95 | — | 25 (1') | Same as #11: EtOH added (70 mg/1 g HTMS) |
|    |   |      |   | 70 (~2') | Clear film forms with no cracks. Stable. |

[a]Water or HCl solution, also containing 1% (wt/wt) Rhodamine-6G.
[b]In H$_2$O
[c]Methanol evaporated at these temperatures. The water addition is carried out at 25° C. during 1 min and the reaction is continued at 80° C. (or 70° C.) for an additional period of time (1-2 min).
[d]Viscosity rises steeply at ~380 mg MeOH weight-loss (from a 1 g HTMS recipe).
[e]Spin-Cast on a supported PMSO layer[(2)] and immediately covered with another one. See text.

TABLE 2

HTMS Fast Sol-Gel Experiments. b. Inert Atmosphere

| No. | H$_2$O/HTMS[a] wt/wt | H$_2$O/HTMS[a] mol/mol | Atm. S C[f] | Temp. (deg C.) | Results and Observations |
|---|---|---|---|---|---|
| 13 | " | 0.95 | N$_2$; N$_2$ | 25 (1') | Same as #12: Three-layered, inert atmosphere |
|    |   |      |             | 70 (~2') | Clear film forms. V. few cracks. Stable. |
| 14 | " | 0.75 | N$_2$; Ar | 60 (1') | Same as #13: No EtOH; higher T; lower MR. |
|    |   |      |           | 70 (~2') | Clear film forms. NO cracks. Stable. Stripes. |
| 15 | " | 0.81 | N$_2$; Ar | 50 (2') | Same as #14, slow addition of water |
|    |   |      |           | 50 → 70 (~3') | Cast single-layer: timing by color change[g]. Clear, crack-free, stable film. Few grains. |
| 16 | " | 0.81 | N$_2$; Ar | 50 (2') | Same as #15, Cast three-layered |
|    |   |      |           | 50 → 70 (~3') | Clear film: No cracks or stripes. Grains. (observed already in solution) |
| 17 | " | 0.81 | N$_2$; Ar | 50 (2') | Same as #16, slow addition of water-MeOH Mixture. |
|    |   |      |           | 50 → 70 (~3') | Clear film: No cracks or stripes. Many grains. |
| 18 | " | 0.95 | N$_2$; Ar | 25 (1') | Same as #13: inert atmosphere in close system |
|    |   |      |           | 70 (~2') | Clear film forms. V. few cracks. Stable. |
| 19 | " | 0.95 | N$_2$; Ar | 25 (1') | Same as #18: Single Layer, 100/1000 EtOH |
|    |   |      |           | 70 (~2') | Clear film forms. V. few cracks. Stable. |
| 20 | " | 0.95 | N$_2$; Ar | 25 (1') | Same as #19: Three layer 100/1000 EtOH |
|    |   |      |           | 70 (~2') | Clear film forms. V. few cracks. Stable. |
| 21 | " | 0.95 | N$_2$; Ar | 25 (1') | Same as #20: Three layer[h] 50/1000 EtOH |
|    |   |      |           | 70 (~2') | Clear film forms. No cracks. Stable. |

[a]-[e]same as in part a.
[f]S and C denote inert gas type during the sol-gel stage and the casting stage, respectively.
[g]Viscosity steep rise upon methanol evaporation is accompanied by a color change from orange to red. Timing of the cast can be thus made without weighing (and exposure to O$_2$).
[h]Molar ration of water-to-siloxane in layers 1 and 3 was 2:1 instead of 1.65:1.

EXAMPLES 8-10

The effect and importance of using an inert gas is shown in Table 1 and Table 2 when polymers are prepared from silane monomers having a hydrogen group in one of the sites.

The effect of additional alcohol on the process is shown in Table 2 in preparing siloxane polymers.

The preparation of a crack-free siloxane glass is shown in Table 2, Example 21.

EXAMPLE 11

Preparation of Glass Films From TMOS and DMDMS

A series of experiments was carried out with binary mixtures of tetramethoxysilane (TMOS) and dimethyldimethoxysilane (DMDMS), employing reaction procedure and casting process used in Example 1. The molar ratio of water to siloxane was kept at 1.5 (substoichiometric, in most cases). The results of these experiments are shown in Table 3.

TABLE 3

Cracking Duration of Sol-Gel Glasses Prepared from TMOS-DMDMS Mixtures[a]

| TMOS (mol. %) | DMDMS (mol. %) | No. —OMe (average) | Time[b] before cracking (h) |
|---|---|---|---|
| 100 | 0 | 4.0 | <1 |
| 75 | 25 | 3.5 | 12 |
| 67 | 33 | 3.3 | 18 |
| 60 | 40 | 3.2 | 36 |
| 55 | 45 | 3.1 | 100 |
| 50 | 50 | 3.0 | ∞ |
| <50 | >50 | >3 | ∞ |

[a]all the experiments were carried out at 80° C. using 10$^{-2}$M, HCl as catalyst. Water to siloxane molar ratio was 1.5:1.
[b]approximate duration until more than 50% of the area is cracked.

The results showed that a 1:1 molar ratio mixture of TMOS and DMDMS forms crack-free films, most likely since it may form a non-crosslinked linear polymer.

EXAMPLE 12

Calculated values of the contraction of several typical and hypothetical compositions are shown in Table 4. Results indicated that minimization of the volume of the reactants and the cast sol leads to elimination of cracking in the glasses produced.

TABLE 4

Calculated Contraction for SiO$_2$ Glass Prepared by the Sol-Gel Technique

| Reactants | SiO$_2$ Weight Fraction | Volume[a] Contraction | Longitudinal Contraction |
|---|---|---|---|
| One-phase |  |  |  |
| Si(OEt)$_4$/H$_2$O/MeOH 1:5:5 (m/m) | 0.13 | 7.6 | 2.0 |
| Two-phase |  |  |  |
| Si(OEt)$_4$/H$_2$O 1:5 (m/m) | 0.20 | 5.0 | 1.7 |
| Si(OMe)$_4$/H$_2$O 1:5 (m/m)[b] | 0.25 | 4.0 | 1.6 |
| Si(OMe)$_4$/H$_2$O 1:1 (m/m)[b] | 0.32 | 3.1 | 1.5 |
| MeSi(OMe)$_3$/H$_2$O 1:1.5 (m/m)[b] | 0.41 | 2.4 | 1.34 |
| "Distilled" recipes: |  |  |  |
| Si(OMe)$_4$/H$_2$O 1:1.5 (m/m)[b] —2MeOH | 0.52 | 1.9 | 1.24 |
| MeSi(OMe)$_3$/H$_2$O 1:1.5 (m/m)[b] —2MeOH | 0.68 | 1.5 | 1.14 |

[a]all densities were taken as 1. Actual density of the sol-gel glass may vary from 0.9 to 1.4, according to the recipe and the procedure employed.
[b]for comparison only (hypothetical reaction: Si(OET)$_4$ → SiO$_2$ + 2Et$_2$O.
[c]single-phase is formed within 10-30 sec.

EXAMPLE 13

Comparison of Film Detachment on Acid or Base Washed Supports

Less detachment occurred in glasses cast on base-washed supports compared to acid-washed supports. The results may be explained by increased adherence of the film to glass supports with a surface etched from

EXAMPLE 14

Effect of Water to Monomer Ratio on Crack Formation

The effect on crack formation by changing the water to monomer ratio was investigated. Lower MR ranges, between 2:1 and 1:1 were tested in order to obtain formation of monohydroxyl and dihydroxyl monomers. The objective was to drive the process toward linear polymerization while keeping minimal volume of the reactants.

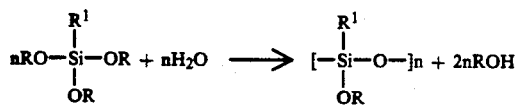

Several representative experiments are summarized in Table 5.

EXAMPLE 16

Embodiment of Laser Dyes in Polymethylsiloxane Glass Films

Embodiment of guest molecules in the sol-gel matrix was accomplished by incorporating guest molecules (e.g. laser dye) in the reaction mixture and proceeding according the regular fast sol-gel procedure of Example 1. Generally, this resulted in dye-embodying glass-films, usually with a marginal effect on the fast-sol-gel process itself.

For laser dyes, a typical loading of 2 mg per 1 g MTMS corresponds to $1.1 \times 10^{-2}$M and $1.7 \times 10^{-2}$M in the PMSO glass (d~ 1.3 g/cm$^3$) for Rhodamine and Coumarin, respectively, which are fairly high concentrations. Higher loadings of these laser dyes, as well as embodied laser dyes of larger molecular weight (>600) were attained with the same fast sol-gel synthesis by increased acid concentration. Embodying of discrete Pyridin-1 species was attained at dye loading of 0.5-1

TABLE 5

Sol-Gel Experiments and Observations Under Acid Catalysts[a]

| Monomer | Water Ratio (m/m) | Temp (°C.) | Ph.M[b] min | Cracking (hours)[c] | Clarity | Remarks |
|---|---|---|---|---|---|---|
| Si(OEt)$_4$ | 5.7 | 25 | ~10 | ~6; M | OK | Ph.S after casting[d] |
| Si(OMt)$_4$ | 5.7 | 60 | <1 | 24; M | OK | — |
| Si(OMt)$_4$ | 1.9 | 60 | <1[e] | — | — | — |
| Si(OMe)$_4$ | 5.0 | 25 | <0.1 | 24; M | OK | detachment from the glass support |
| Si(OMe)$_4$ | 2.0 | 25 | <0.1 | 24; M | OK | detachment from the glass support |
| Si(OMe)$_4$ | 1.0 | 60 | <0.1 | 24; M | OK | detachment from the glass support |
| Si(OMe)$_4$ | 1.5 | 60 | <0.1 | 24; M | OK | detachment from the glass support |
| MeSi(OMe)$_3$ | 1.5 | 25 | <0.1 | 24; F | Milky | Ph.S after casting @ 24 h |
| MeSi(OMe)$_3$ | 1.5 | 60/25[f] | <0.1 | 24; F | Milky | Ph.S after casting |
| MeSi(OMe)$_3$ | 1.5 | 65-70 | <0.1 | none | Milky | Ph.S after casting (v. slight) |
| MeSi(OMe)$_3$ | 1.5 | 70 | <0.1 | none | Clear | Regular Dye Abs. & Fluores. Spectra |
| MeSi(OMe)$_3$ | 1.5 | 70-80 | <0.1 | none | Clear | Regular Dye Abs. & Fluores. Spectra |

[a]Catalyzed with HCl, $10^{-2}$M.
[b]Ph.M — Phase Merging: the time until reactants merge into single phase is indicated.
[c]Time of earliest observation of cracks. F — few; M — many.
[d]Ph.S. — Phase Separation occurring after the film is cast.
[e]Glass precipitation occurs within 90 min. at this ater-to-monomer ratio.
[f]Performed in two steps, 10 min. each, at 60° C. and then 25° C.

Results indicated that methyltrimethoxysilane monomer could be used at MR as low as 1:1, in contrast to sol-gel reactions of TEOS. Phase-merging of the reactants was typically observed within a few seconds even at room temperature and the reaction remained homogeneous throughout the hydrolysis and condensation steps. Unlike TMOS gels, the MTMS gels could be cast or spin-cast onto appropriately prepared supports and dried at ambient temperatures and humidity. These films remained crack-free and shock sensitive. This drying was effective for films up to 25 μm.

EXAMPLE 15

As shown in Table 5, the MTMS sol-gel reactions were carried out at a temperature range of 25°-60° C. At the higher temperatures, more vigorous hydrolysis was observed and gelation occurred more quickly. A short time after casting, all the glasses developed a milky opaque surface. By elevating the temperature to nearly 80° C. during hydrolysis and polymerization, more even hydrolysis was attained and later phase separation was eliminated.

mg/g monomer. Loadings smaller by two orders of magnitude were attained with Polyphenyl-1 due to its low solubility in the reactants. When proper dissolution of the guest molecules in the polymerizing siloxane was maintained, the resultant glass exhibited absorbance and fluorescence spectra typical of the discrete embodied species.

EXAMPLE 17

Donor-acceptor type molecules such as PNA and DDS are embodied in the PMSO glasses by the same fast sol-gel process of Example 1 as laser dyes. Higher loadings (10-15%) of these chromophores were prepared with the same fast sol-gel synthesis and again, an increased concentration of acid was required to retain the fast rate and the good optical quality of the glass.

EXAMPLE 18

Metal ions (e.g. Cu, Ti, Ce, A) were easily incorporated into the fast sol-gel recipe. However, most metal ions tended to induce aggregation of PMSO particles, resulting in a grainy appearance. Therefore, their incorporation (as aqueous solution of their salt, at the typical loading of 2 mg/g MTMS) was preferably done when the sol-gel process was almost completed, and additional polymerization was allowed for a few seconds only. The spin-casting was immediately carried out before in-vial gelation or aggregation could take place. The resulting glass had the typical coloration and absorbance of the metal salt as well as the optical clarity of the PMSO glass.

EXAMPLE 19

High concentrations of donor-acceptor molecules were difficult to embody in a sol-gel glass matrix because these compounds generally exhibited little miscibility in the siloxane monomer due to their polar nature. This problem was aggravated when high loadings of chromophores in sol-gels (e.g., 5-15% w/w) were attempted. The following procedure illustrates parametric-tuning of the reaction to overcome reprecipitation problems.

Embodiment of High Concentrations of Guest Molecules in Polymethylsiloxane Glass Films A typical reaction mixture of 1 g methyltrimethoxysilane, 0.2 g HCl and 2 mg of a chromophore, for example, p-nitroaniline, were heated to 80° C. until all ingredients were in solution. After the methanol weight loss reached 350 mg/g monomer, the resultant viscous liquid was spun cast onto a suitable support (typically glass plates). In order to keep the solution precipitate-free until sufficient molecular weight and viscosity had been attained, sufficient methanol was kept in the sol-gel until the casting stage. This was accomplished by carrying out the first five min of polymerization in a sealed vial, followed by cautious removal of the cap to allow evaporation until weight loss of the methanol reached 350 mg/g monomer. By comparison, typical films prepared from methyltrimethoxy silane without added chromophore were cast after weight loss of methanol was 500 mg/g polymer.

Fast evaporation of the methanol from the spun gel led to its early solidification, in the case of high loadings of PNA and DDS and high water-to-siloxane molar ratio (MR) and to the formation of solute crystallites and inhomogeneous film thereafter. To slow the evaporation, less volatile solvents were added. Typical recipes are shown in Table 1.

The solvent-to-monomer ratio was tuned for a particular chromophore and loading. This allowed solvation of the guest molecules in the formed polymer along the reaction without eliminating phase separation.

EXAMPLE 20

Embodiment of Dye Molecules in Polysiloxane Glass Films

Thin films were prepared as described in Example 7 except that Rhodamine-6G was added to the water, ethanol, and trimethoxysilane mixture. Fluorescence and absorption spectra of the dye in the resulting polyhydrogen siloxane glass were compared with the spectra in silica glass, in polymethylsiloxane glass, and in solution, Table 6.

TABLE 6

Absorbance and Fluorescence Maxima of Rh6G Laser Dye in Sol-Gel Glasses and in Solution

| MEDIUM | ABSORBANCE MAXIMUM | FLUORESCENCE MAXIMUM |
|---|---|---|
| Ethanol | 530 | 580-600 |
| Silica glass (SiO$_2$) | 525 | 572 |
| Polymethylsiloxane (PMSO) | 532 | 557 |
| Polyhydrogensiloxane (PHSO) | 524 | 558 |

TABLE 6-continued

Absorbance and Fluorescence Maxima of Rh6G Laser Dye in Sol-Gel Glasses and in Solution

| MEDIUM | ABSORBANCE MAXIMUM | FLUORESCENCE MAXIMUM |
|---|---|---|
| Polyhydrogensiloxane following oxidation | 524 | 564 |

Figure 5A:
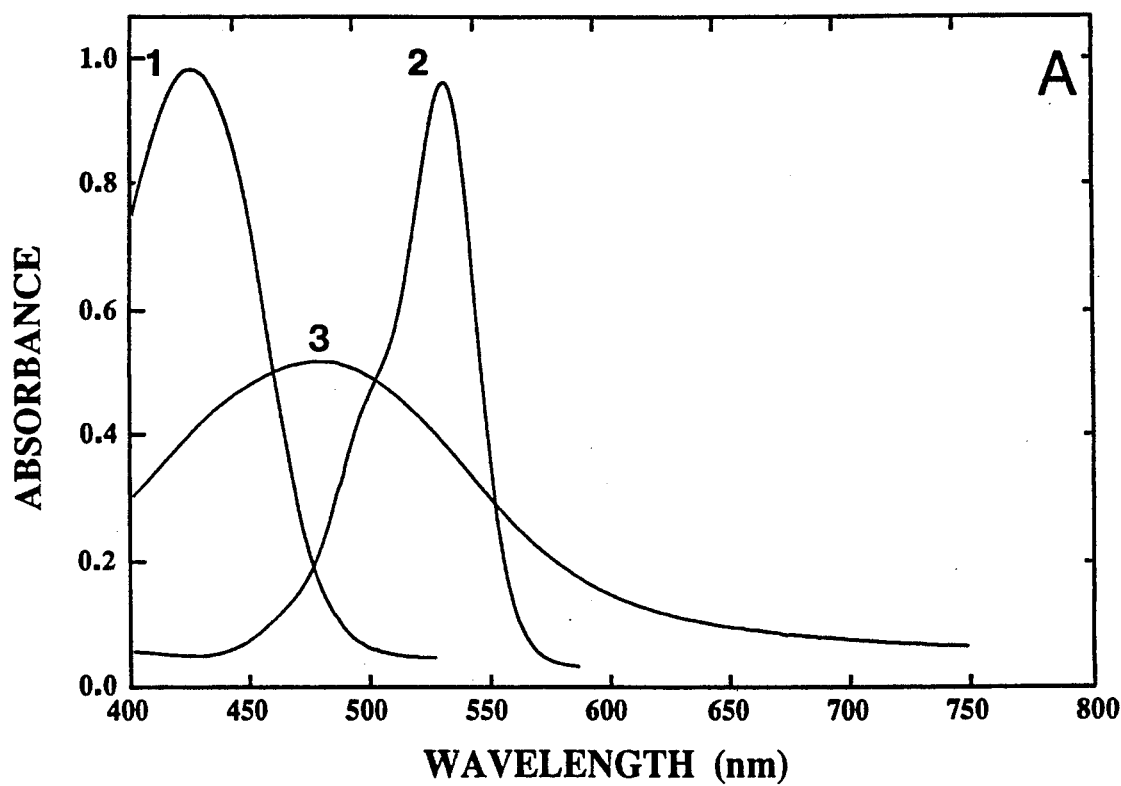
FIG. 5 shows absorbance (A) and fluorescence (B) spectra of coumarin -153 (1), Rhodamine-6G (2) and Pyridine-1 (3) in PMSO thin-film glass.
Figure 5B:
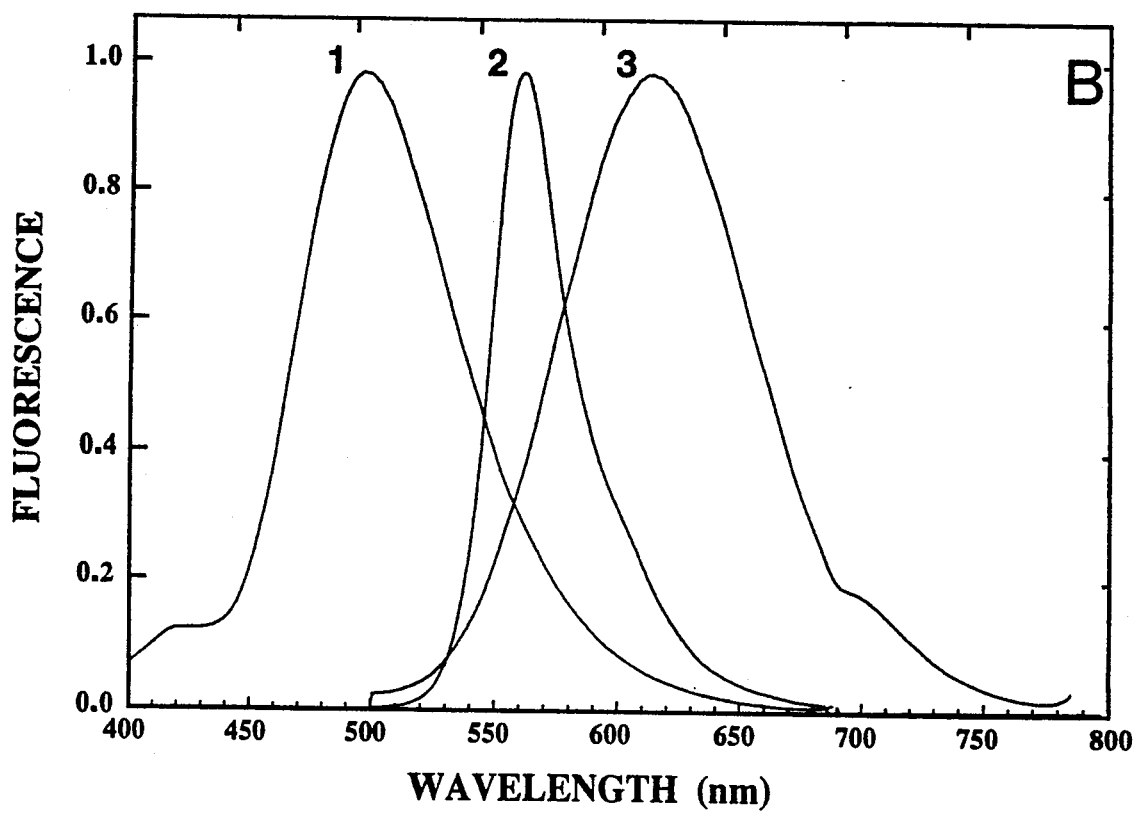

Fluorescence and absorption spectra of Rh6G in a polymethylsiloxane glass are shown in FIG. 5, spectrum 2. The absorbance maximum in PHSO glass is close to that in silica glass (SiO$_2$), and is blue-shifted as compared to the solution, and in contrast with PMSO. The fluorescence maximum in PHSO is close to that of PMSO and is strongly shifted to the blue compared to the solution phase. This slight shift may be attributed to the more hydrophilic nature of the first two matrices as compared with PMSO and ethanol. The oxidation of PHSO to silica glass did not, therefore, result in an additional change in the absorbance.

EXAMPLE 21

Preparation of Polymethylsiloxane Glass Films Under Basic Catalysis

Inclusion of NLO molecules which carry amino-groups and substituted amino-groups, pyridine groups, etc. in sol-gel glass prepared by acid catalysis may face some difficulties if the guest molecules undergo some protonation. Among the laser dyes, Pyridin-1 is an example which requires additional measures if it is to be embodied in the sol-gel glass at high concentrations. It was desirable, therefore, to modify the new fast synthetic route and adapt it for basic catalysis.

Upon use of strong bases, e.g., NaOH, the aqueous phase and siloxane phases remained immiscible. Hydrolyzed siloxane molecules formed at the interface of the phases with subsequent undergo rapid condensation and precipitation. Therefore, basic catalysts exhibiting higher miscibility in organic media were tested.

Upon catalysis with ammonium hydroxide the phase separation was eliminated. Rate became very low due to weak basicity of the catalyst while increase of catalyst concentration resulted in phase separation.

Upon catalysis with dimethylamine (pK$_b$~3.3 $10^{-3}$ at 25° C., fast and facile sol-gel reactions was maintained using concentrations between $10^{-2}$ to 4.4M. The higher compatibility of the organic base with both phases thus assists in their merging. In this respect, the organic base acted as a micro-surfactant. Further, this catalyst was volatile and upon consumption of most of the water, the base-protonation reaction shifts to the left:

and the volatile free amine was expelled from the gel, thus slowing down the condensation. The later self-regulation phenomenon is of special importance for the sol-gel curing process: the more crosslinked the glass became, the more time was needed for stress relaxation processes. This relaxation period was extended by the catalyst evaporation and the consequent decrease of the condensation rate. Hence, glasses formed following casting onto a support behaved similarly to those prepared by the acid catalysis. All dyes investigated could be embodied in the sol-gel glass. Residual amines in the glass quenched the fluorescence of the glass-embodied dyes and therefore had to be removed from the glass films by either washing with water or by vacuum drying.

Absorbance and Fluorescence of Laser Dyes Embodied in Polymethylsiloxane Glass Films Absorbance and fluorescence spectra of several laser-dyes embodied in supported PMSO glass films prepared under acid catalysis are shown in FIG. 5. These spectra are typical of discrete dye molecules and are comparable to data in the literature. In Table 7 the absorbance and fluorescence maxima in solution and in PMSO glasses prepared under acid and base catalysis are compared for the four laser dyes studied. The absorbance maxima in the glass are very close to those in solution, and the slight shifts exhibit a mixed trend.

TABLE 7

Comparison of Absorbance and Fluorescence Maxima of Laser Dyes in Sol-Gel Glass and in Solution

| DYE | MEDIUM | ABSORBANCE MAXIMUM[c] | FLUORESCENCE MAXIMUM[c,d] |
|---|---|---|---|
| Rhodamine 6G | Ethanol | 530 | 581[e] (308) |
|  | PMSO[a] | 532 | 557 (308) |
|  | PMSO[b] | 536 | 525 (308) |
| Coumarin 153 | Ethanol | 423 | 540[e] (308) |
|  | PMSO[a] | 428 | 504 (308) |
|  | PMSO[b] | 410 | 525 (308) |
| Pyridin-1 | Ethanol | 480 | 710[e] (510) |
|  | PMSO[a] | 480 | 615 (480) |
|  | PMSO[b] | 486 | 597 (480) |
| Poly-phenyl-1 | Ethanol | 308 | 382[f] (308) |
|  | PMSO[a] | 298 | 374 (308) |
|  | PMSO[b] | 270 | 420 (270) |

[a]Polymethylsiloxane matrices prepared via HCl catalysis.
[b]Polymethylsiloxane matrices prepared via Me$_2$NH catalysis.
[c]Solution data taken from Lambdachrome dyes catalog (44)
[d]Excitation wavelength denoted in brackets.
[e]In methanol.
[f]In ethylene glycol.

The slight shifts in acid catalyzed PMSO glass, as compared to the solution, may be attributed to the interaction of the dye molecules with the acidic glass environment. Only Polyphenyl-one shows a blue-shift in its absorption, and it is the only di-anion molecule, while Coumarin-153 is originally neutral and Rhodamine-6G and Pyridin-1 are both cations. On the other hand, all the dyes exhibit distinct blue-shifts of the fluorescence maxima. These shifts should most probably be attributed to the caging effect of the glass. The most prominent blue-shift exhibited by Pyridin-1, may also be an outcome of replacement of the perchlorate anions by chloride.

In base-catalyzed glass the absorbance and fluorescence also exhibited a mixed trend. The pattern was opposite to that of the acid-catalyzed glass: a blue shift of the absorbance and a red shift of the fluorescence was exhibited by the Polyphenyl (anion) dye, in contrast to the slight red shifts in the absorbance and blue shift in the fluorescence of Rhodamine and Pyridine (cation) dyes. Nonetheless, the intensity of fluorescence in Me$_2$NH catalyzed glass was usually -12 orders of magnitude lower than acid-catalyzed glass of comparable dye loading, and an increase in the fluorescence intensity could often be attained by prolonged extraction of the amino-base by water. These effects appeared to result from the relatively high concentrations of the catalysts which unless leached out, remain in the glass. Thus, they extensively affect the various types of dyes according to their ionic nature in the ground state as well as in the excited states.

EXAMPLE 22

Multilayered Polymethylsiloxane Glasses

Successive spin-casting of several layers of PMSO on a support according to the procedure of Example 1 resulted in a multilayered assembly. The sol-gel and drying processes of a single-layer was applied in a straight-forward manner to the preparation of a multilayered assembly of total thickness up to 50 μm. Thicker or larger dimensioned films required an extended period of slow drying at room temperature.

Polymethylsiloxane Waveguides

In order to convert such a PMSO multiple-layer assembly into an efficient waveguide, a supported three-layer assembly was prepared in which the middle layer had a higher index of refraction than the other two, which thus serve as cladding layers for the middle one: $n_2 > n_1$ and $n_2 > n_3$. This increase in the index of refraction was attained either by the dye itself, by maintaining high concentration of dye embodying in the middle-layer, or by incorporation into the middle layer of monomers carrying aromatic groups (e.g. phenyltriethoxysilane). The waveguide property was demonstrated by measuring front-face vs. right-angle fluorescence of three-layer assembly comprising a laser-dye in its middle layer: in spite of the fact that the right-angle dye-area was three orders of magnitude smaller than that of the front-surface (~10 μm vs. ~10 mm), the fluorescence intensities differed only by a factor of 10. This indicated that in such an assembly, most of the fluorescence intensity was guided through the dye-layer and only a small portion came out through its surfaces. This property may favor lasing in the dye-layer if sufficient pumping power is applied and appropriate cavity conditions are accomplished.

A slight increase in the water-to-siloxane molar ratio was required to ensure proper adherence between the layers when multilayered films larger than 1"×1" were prepared. The surface of cast PMSO films, for example, tends to rearrange to match the environment it is facing. The surface of a PMSO gel which was cast onto Parafilm TM (American Can Company) and separated from the support after curing was hydrophobic, as indicated by a contact angle >86° C., while that cast onto cellophane was hydrophilic, contact angle <37° C. Hence, the gel surface exposed to air becomes quite hydrophobic, allowing some gliding of the successive gel-layer on its methyl-rich surface. Additional water in the recipe increased the hydrophilic nature of the surface and thus facilitated stronger adherence between layers and eliminated the "gliding" obstacle.

EXAMPLE 23

Electric Field Curing of Sol-Gel Films

Sol-gel films were prepared as described in Example 1 using methyltrimethoxysilane monomer except that accelerated curing was induced by application of a high direct current voltage across the polymer bulk, using glow discharge from a high voltage electrode mounted above the polymer surface.

Figure 6:
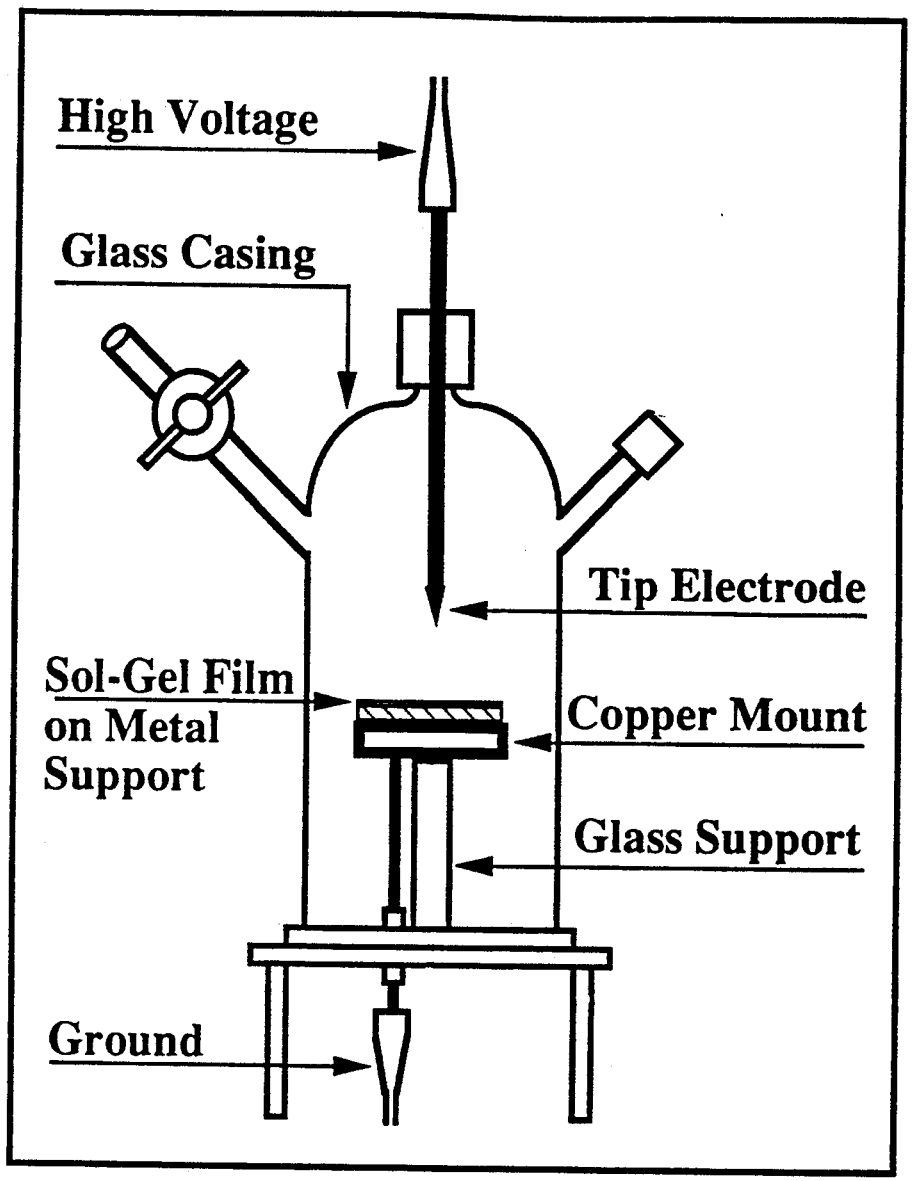
FIG. 6 is a schematic representation of the set-up used for glow discharge polymer films.
Figure 7:
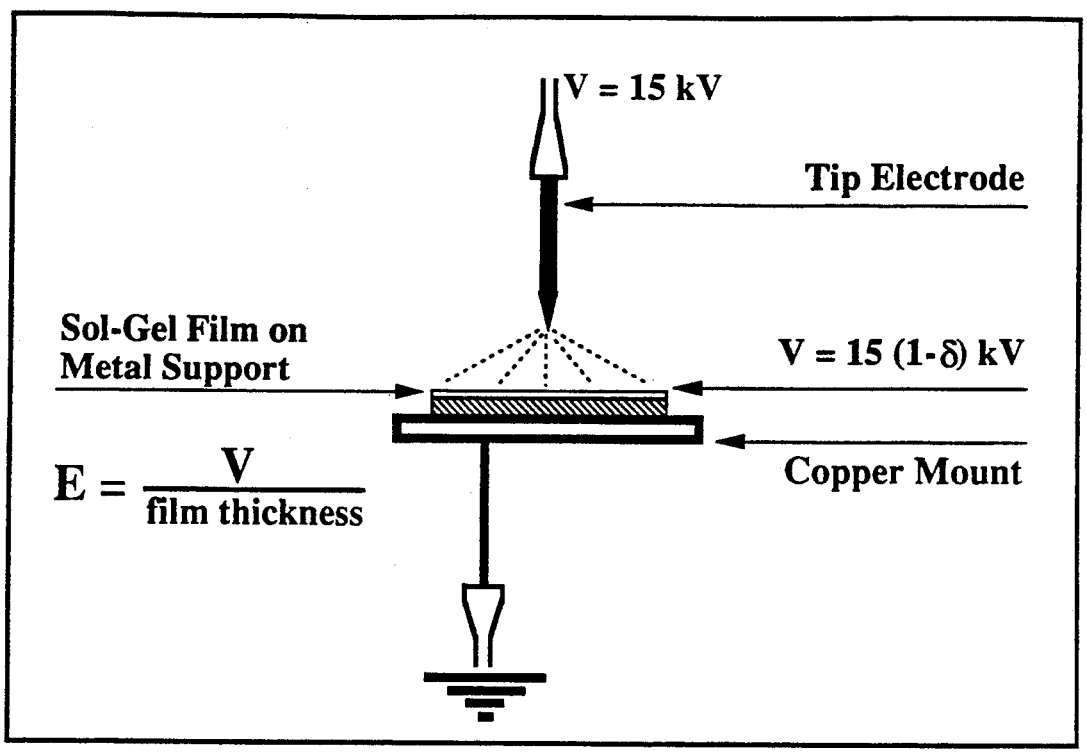
FIG. 7 illustrates the electric field formed across insulating films.

The set-up used for glow discharge curing of gels and gel-embodied molecules is shown in FIG. 6. The high voltage power supply used was a "DC High Voltage Insulation Tester" (Lanagan & Hoke, Inc.) capable of supplying up to 15 kV and 500 μA. Gel samples, freshly cast on a metallic support, FIG. 7, were placed on the lower flat electrode. The center tip-electrode was placed at a distance of 0.2 to 0.8 inches above the gel. The high voltage was applied gradually until reaching the maximum allowable value (which was still arc-free). The glow discharge was continued until the surface of the gel appeared cured, as manifested by loss of gloss.

Table 8 shows the results of glow discharge curing on polymethylsiloxane films prepared with various MR. Gel films were observed to dry and harden in exceptionally short periods of time. Less than 20 min was required for the water-rich recipes (water to siloxane molar-ratio, MR=2) while less than 90 min was required for stoichiometric recipes of MR=1.5. By comparison, curing at room temperature without glow discharge required from 8 to 96 hours.

TABLE 8

Curing Time and Surface Properties of Glow Discharged Sol-Gel Films

| H2O/MTMS Molar Ratio[a] | Voltage-Current-Time Glow Discharge Curing Sequence (kV-μA-min)[b] | Curing Time (min) | Contract Angle (aver:deg) |
|---|---|---|---|
| 2.25 | 10-12-2; 12-12.5-2; 13-15-2; 14-18-2; 14.5-15-4; 15-18-8 | <20 (<16 h) | 61 ± 5 (79 ± 2) |
| 2.0 | 10-2-1; 12-2-1; 13-3-1; 14-4-2; 14.5-8-2; 15-8-13 | 20 (~16 h) | 71 ± .4 (78 ± 1) |
| 1.8 | 10-1-0.5; 12-3-1; 13-4-1.5; 13.5-6-4; 14-10-4; 14.5-9-2; 15-12-7 | 20 | 50 ± 16 |
| 1.8 | 10-10-0.5; 12-10-0.5; 13-10-0.5; 14-13-0.5; 14.5-14-3; 14-10-13; 14.5-10-40 | 60 (~32 h) | 72 ± 1 (67 ± 2) |
| 1.65 | 12-12-1; 14-12-1; 14.5-14-28; 14.5-12-30 | 60 (~48 h) | 71 ± 1 (70 ± 3) |
| 1.5 | 12-11-0.5; 14-12-0.5; 14.3-13-59; | 60 (>96 h) | 70 ± 1 (65 ± 3) |
| 1.4 | 12-9-0.5; 14-12-0.5; 14.3-11-59; 14.3-8-30; | >90 (~96 h) | 48 ± 9 (66 ± 4) |

As shown in Table 8, a high electric current on the order of 10-20 μA was observed. Calculations of the charge involved in electrolysis of gel-surface ions were made and compared with the overall charge of the electrolyte ions in the gel-film (1"×1" of typical thickness 10 μm, d 1.3 g/cm³:

$$Q^1 = 20 \times 60 \times 15 \ \mu A = 18 \ mCb$$

$Q_2 = 6.25 \times 0.001 \times 1.3 \ g \times (2.25 \times 18)/67 \times 0.01/1000 \ mole/g \times 96,500 = 4.7 \ mCb$ The two overall charges are the same order of magnitude, yet Q₁ is more than three times larger.

Additional glow discharge experiments were carried out using polysiloxane (PHSO) gels with low water-to-siloxane ratios (1.35) and much higher molarity of acid (0.3 M, as compared with the 0.01M used in preparing polymethylsiloxane (PMSO) films, see Table 5. The current observed during glow discharge curing was <0.5 μA, with curing complete within 20-30 min., indicating that water content role is a major factor in accelerating the curing and the observed current.

EXAMPLE 24

Effect of Curing Method on Film Surface Properties

Film surface properties were found to depend on the method of curing. Surfaces of polymethylsiloxane films cured at ambient conditions were hydrophobic. In contrast, films cured by the corona-discharge method of Example 23, had hydrophilic surfaces, as indicated by much lower contact angles. The hydrophilicity was most clearly observed in films prepared at super-stoichiometric recipes of MR>=1.65. There is a slight decrease in contact angle for MR<1.5 stoichiometric ratios. This may be attributed to a small degree of phase separation which was observed on top of the gel as nonhydrolyzed monomer produced by disproportionation reactions. This layer is methoxyl-rich and eventually undergoes slow hydrolysis and condensation to yield the less hydrophobic layer.

EXAMPLE 25

Effect of Glow Discharge Curing on Binding of Guest Molecules

Siloxane-bound chromophore model compounds carrying amino groups were prepared using chlorotrimethylsilane, Table 9. Absorbance and fluorescence were measured and used to follow the formation of the Si-chromophore bonds:

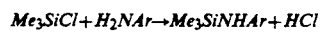

$Me_3SiCl + H_2NAr \rightarrow Me_3SiNHAr + HCl$

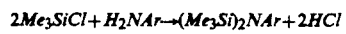

$2Me_3SiCl + H_2NAr \rightarrow (Me_3Si)_2NAr + 2HCl$

Typical spectra of PNA show a substantial red shift of both absorbance and fluorescence maxima upon binding of the amino donor-acceptor molecule to Si monomer. PMSO engaging alone under acid catalysis resulted in a blue shift of the entrapped chromophores.

TABLE 8

Absorbance and Fluorescence Data of Free and Bound Chromophores

| Solvent | Reagent | Absorbance Maxima (nm) | Fluorescence Maxima (nm) |
|---|---|---|---|
| a. DDS | | | EX. 290 nm |
| CH₃CN | — | 204   260   294 | 394 |
| " | HCl | 196   276 | 404 |
| " | Me₃SiCl | 190   238 wb   294 | 394   413 |
| " | Me₃SiCl + 1 h | 190   238 wb | 413   452 |
| " | Me₃SiCl + 3 h | 190   238 v.wb | 413   483 |
| PMSO | =SiOMe 2 days | 202   260 | 337   414 |
| b. PNA | | | EX. 320 nm |
| CH₃CN | — | 228 wb   360-366 sb | 337 sb   416 sh   501 sh |
| " | HCl | 228 v.wb   360-366 wb | 377 ss   393 ss   412 ss   501 sh |
| " | Me₃SiCl | 252 ws   364 wb | 425   459 |

TABLE 8-continued

| Solvent | Reagent | Absorbance Maxima (nm) | | | Fluorescence Maxima (nm) | | | |
|---|---|---|---|---|---|---|---|---|
| " | Me$_3$SiCl + 1 h | | | | | | | |
| " | Me$_3$SiCl + 3 h | | | | 381 | 403 | 422 | 448 |
| PMSO | ≡SiOMe 2 days | 192 | 222 | 364 | 380 | 415 | | 460 sh |
| | | 196 | 226 | 366 | 390 | | | 460 sh | ss — strong, sharp; sb — strong, broad; sh — shoulder; ws — weak, sharp; wb — weak, broad In thermally annealed PMSO the major change in the fluorescence of the entrapped DA molecules was smearing. In the first few days of annealing at 65° C., the peak shifted to the blue. After prolonged annealing (about 50 days), a small yet distinguished red-shift was observed indicating chemical binding of the entrapped DA molecule to the matrix. The intense smearing of the fluorescence to the blue as well as to the red suggested a mixture of species, partly bound to the matrix to a variety of degrees and partly protonated.

The relatively large fluorescence red-shift of the donor-acceptor molecules in glow discharge cured PMSO (90 min curing at room temperature) indicated substantial chemical binding. Smearing of the fluorescence far to the red indicated a substantial number of the molecules had undergone more than one binding reaction. Enhanced binding may be attributed to the sweeping of H+ions from already formed Si-NH bonds to other sites of reaction:

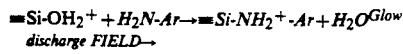

$$\equiv Si\text{-}OH_2^+ + H_2N\text{-}Ar \xrightarrow{\text{Glow discharge FIELD}} \equiv Si\text{-}NH_2^+\text{-}Ar + H_2O$$

Typical recipes for preparing PMSO films loaded with amino chromophores are shown in Table 10.

TABLE 7

Typical Sol-Gel PMSO Recipes Loaded With Amino-Chromophores[a]

| Chromophore | Loading | Water/PMSO Molar Ratio[b] | Add. Solvent (% w/w) | Add. 1M HCl (% w/w) | Remarks |
|---|---|---|---|---|---|
| PNA | 35 | 2:1 | — | 4 | |
| PNA | 150 | 2:1 | CH$_3$CN; 30 | 12 | Solidifies as cast. |
| DANS | 10 | 2:1 | — | 4 | |

[a] % loading respective to the sole composition. In brackets are the loadings in the final glass.
[b] Water containing 10$^{-2}$M HCl.

EXAMPLE 26

Photophysical studies were performed on the non-binding donor-acceptor chromophore DANS in glow discharge cured and thermally cured PMSO matrices to determine electrolyte correlation with water removal during curing.

Fluorescence of DANS Entrapped in Cured PMSO Matrices

The fluorescence spectra of DANS entrapped in thermally cured and glow discharge cured PMSO matrices prepared from water-rich and water-like recipes were determined. The fluorescence maxima of the protonated and non-protonated DNAS species is separated by about 180 nm at 597-611 and 416-418 nm respectively. DANS in "regular" and thermally cured PMSO is almost completely protonated. In the glow discharge cured and water-lean PMSO samples prepared at the same DANS-HCl molar-ratio, peaks of both protonated and free DNAS molecules are found. When water-rich recipe is glow discharge cured, only a single fluorescence peak of the free DANS was found, while in the protonated species a small shoulder remained.

EXAMPLE 27

Films prepared from polyamine polymers were cured at room temperature under normal atmospheric conditions. Curing time was approximately 1 hr.

The present invention has been described in terms of particular embodiments found by the inventors to comprise preferred modes of practice of the invention. It will be appreciated by those of skill in the art that in light of the present disclosure numerous modifications and changes can be made in the particular embodiments exemplified without departing from the intended scope of the invention. For example, a wide variety of molecules may be incorporated into the aforedescribed films, including electrochemically active species, species of polar molecules oriented to produce nonlinear optical devices, and optical wave guides. All such modifications are intended to be included within the scope of the claims.

REFERENCES

The references listed below are incorporated herein by reference to the extent they supplement, explain, provide a background for or teach methodology, techniques and/or compositions employed herein.

1. Proc. Int. Workshop, "Glasses and Glass Ceramics from Gels", Gottardi, V., Ed., J. Non. Cryst. Solids, vol. 48, 1982.
2. "Sol-Gel Technology for Thin films, Fibers, Preforms, electronics and Specialty Shapes", Klein, L. C., Ed., 1988, Noyes Publ., Park Ridge, N.J.
3. Reisfield, R., J. Phys. Coll. C7 Supp. 12, 1987, 48, 423.
4. Reisfeld, R., Brusilovski, D., Eyal, M., Miron, E., Burstein, Z., Ivri, J. Chem. Phys. Let., 1989, 160,43.
5. Yoldas, B. E., J. Matr. Sci., 1977, 12, 1203.
6. Kobayashi, Y., Kurokawa, Y., Imai, Y., J. Non-Cryst. Solids, 1988, 105, 198.
7. Avnir, D., Kaufmann, V. R., J. Non-Cryst. solids, 1987, 92, 110.
8. Hara, U.S. Pat. No. 5,008,219, Apr. 6, 1991.

What is claimed is:

1. A rapid method of preparing a stable, optically clear glass, comprising the steps:
   providing a silicon oxide monomer, said monomer consisting essentially of a monomer having two or three hydrolyzable groups;

hydrolyzing the monomer with a near-stoichiometric amount of water;

polymerizing the monomer while maintaining a single phase throughout the hydrolyzing and polymerizing wherein hydrolysis and polymerization is accomplished in a total time of less than about 15 minutes; and curing the polymerized monomer to provide a crack-free optically clear glass.

2. The method of claim 1 wherein said hydrolyzing is carried out at an elevated temperature.

3. The method of claim 1 or 2 further comprising a catalyst.

4. The method of claim 1, 2, or 3 wherein the metal in the monomer is silicon, titanium, aluminum, barium, copper or yttrium.

5. The method of claim 4 wherein the monomer has three, four, or five substituents which are independently, an alkoxy group or a nonhydrolyzable group, provided that two or three are alkoxy groups and remaining sites are occupied by a nonhydrolyzable group.

6. The method of claim 5 wherein the alkoxy is ethoxy.

7. The method of claim 5 wherein the alkoxy is methoxy.

8. The method of claim 5 wherein the nonhydrolyzable group is hydrogen.

9. The method of claim 5 wherein the nonhydrolyzable group is methyl.

10. The method of claim 5 wherein the nonhydrolyzable group is ethyl.

11. The method of claim 1 wherein the metal alkoxide monomer is a trialkoxy-substituted.

12. The method of claim 1 wherein the metal alkoxide monomer is methyltrimethoxy-substituted.

13. The method of claim 1 wherein the metal alkoxide monomer is dimethyldimethoxy-substituted.

14. The method of claim 5 wherein the monomer is blocked for hydrolysis at one site.

15. The method of claim 5 wherein the monomer is blocked for hydrolysis at two sites.

16. The method of claim 5 wherein the monomer which has five sites is blocked for hydrolysis at three sites.

17. The method of claim 1 wherein a substantially pure polysiloxane glass is prepared from a trialkoxysilane monomer.

18. The method of claim 17 wherein the nonhydrolyzable group is hydrogen.

19. The method of claim 5 wherein the monomer is a substituted silane.

20. The method of claim 19 wherein the monomer is trimethoxysilane.

21. The method of claim 1 wherein polymerization is conducted in a nonoxidizing atmosphere.

22. The method of claim 21 wherein the nonoxidizing atmosphere is nitrogen or argon.

23. The method of claim 1 wherein the water to monomer molar ratio is between about 0.75 to 1.5.

24. The method of claim 23 wherein the water to monomer molar ratio is about 0.95 to 1.5.

25. The method of claim 1 wherein volatile products of the hydrolyzing are removed during polymerization.

26. The method of claim 25 wherein removal of said products of the hydrolyzing is by distillation.

27. The method of claim 26 wherein methanol, water or catalyst is removed.

28. The method of claim 1 wherein said polymerizing is carried out at about 70°-80° C.

29. The method of claim 1 wherein the polymerized monomer is cured in bulk.

30. The method of claim 1 further comprising adding a volatile alcohol during polymerization of a monomer having one site occupied by hydrogen, said added alcohol having less volatility than alcohol produced by hydrolyzing said monomer.

31. The method of claim 1 wherein the glass is cured by air-drying.

32. The method of claim 1 wherein the glass is cured under inert atmosphere.

33. The method of claim 3 wherein the catalyst is an acid or base catalyst.

34. The method of claim 33 wherein the catalyst is hydrochloric acid.

35. The method of claim 33 wherein the catalyst is dimethylamine.

36. A glass prepared by the method of claim 1.

37. A thin film prepared by the method of claim 1.

* * * * *